(12) United States Patent
Kostka et al.

(10) Patent No.: US 6,851,219 B2
(45) Date of Patent: Feb. 8, 2005

(54) HYDROPHILICITY OF WATER REPELLENT SOIL

(75) Inventors: Stanley J. Kostka, Cherry Hill, NJ (US); Paul Thomas Bially, Sicklerville, NJ (US)

(73) Assignee: Aquatrols Corporation of America, Inc., Paulsboro, NJ (US)

( * ) Notice: Subject to any disclaimer, the term of this patent is extended or adjusted under 35 U.S.C. 154(b) by 0 days.

(21) Appl. No.: 10/266,025

(22) Filed: Oct. 7, 2002

(65) Prior Publication Data

US 2003/0115793 A1 Jun. 26, 2003

Related U.S. Application Data

(60) Provisional application No. 60/328,027, filed on Oct. 9, 2001.

(51) Int. Cl.[7] ............................................. A01G 31/00
(52) U.S. Cl. .................. 47/59 S; 47/58.1 SC
(58) Field of Search .................. 47/58.1 SC, 59 R, 47/59 S, DIG. 10

(56) References Cited

U.S. PATENT DOCUMENTS

| | | | |
|---|---|---|---|
| 2,867,944 A | 1/1959 | Fletcher | 47/58 |
| 5,024,821 A | 6/1991 | Greenshields et al. | 423/23 |
| 5,385,750 A | 1/1995 | Aleksejczyk et al. | 427/4 |
| 5,468,718 A | 11/1995 | Burval et al. | 504/206 |
| 5,580,841 A * | 12/1996 | Chan et al. | 504/206 |
| 5,883,112 A * | 3/1999 | Pilato et al. | 514/404 |
| 5,958,104 A | 9/1999 | Nonomura et al. | 71/11 |
| 6,015,910 A * | 1/2000 | Wu | 548/367.7 |
| 6,117,816 A * | 9/2000 | Jimoh et al. | 504/118 |
| 6,165,939 A * | 12/2000 | Agbaje et al. | 504/105 |
| 6,241,994 B1 * | 6/2001 | Lee et al. | 424/408 |
| 6,451,731 B1 * | 9/2002 | Agbaje et al. | 504/118 |
| 6,460,290 B1 * | 10/2002 | Moore et al. | 47/48.5 |
| 6,479,437 B1 * | 11/2002 | Bratz et al. | 504/266 |

FOREIGN PATENT DOCUMENTS

WO    WO 98/39273    9/1998    ............ C05G/3/06

* cited by examiner

*Primary Examiner*—Son T. Nguyen
(74) *Attorney, Agent, or Firm*—John A. Shedden

(57) ABSTRACT

Water repellent soil is treated with low concentrations of a blend of alkyl polyglycoside and EO/PO block copolymer in a weight ratio range of from 6:1 to 0.5:1 of glycoside to block copolymer in order to rapidly increase the wetting rate of the water repellent soil.

10 Claims, No Drawings

HYDROPHILICITY OF WATER REPELLENT SOIL

This application claims the benefit of U.S. Provisional Patent Application Ser. No. 60/328,027 filed Oct. 9, 2001.

FIELD OF THE INVENTION

The present invention generally relates to the use of surfactant blends to enhance the infiltration of water and/or aqueous compositions through water repellent soil. More particularly, the present invention relates to blends of alkyl polyglycosides and ethylene oxide-propylene oxide block copolymers to rapidly improve the hydrophilicity of such soil.

BACKGROUND OF THE INVENTION

Agriculturalists have to work with all types of plant growth media such as sand, natural earth, horticultural soils, and various soil-mimicking, soil-less plant culture substrates; however, the bane of essentially all agriculturalists is water repellent soil. Water repellent soil retards water infiltration into the soil matrix and often renders entire areas of the upper layers of the soil substrate essentially impervious to water penetration. Under rainfall or irrigation conditions, dire environmental consequences can result from the water repellency of the topsoil, such as surface runoff of water and aqueous compositions containing pesticides, this term inclusive of fertilizers, into pristine areas and/or potable reservoirs. Furthermore, and less obvious, are the serious consequences that result from aqueous pesticide flow through "fingers" that usually attend water repellent soil which can provide rapid transport of pesticide compositions to the local ground water table and thus increase the risk of ground water contamination.

Water repellency of a soil is not only a function of the initial water content of the soil, but is also a function of soil particle size (sands are more prone to water repellency than clays), as well as, type of organic matter incorporated in it. This organic matter induces water repellency in the soils in many ways, such as by providing hydrophobic organic substances leached from the plant litter; organic substances that have been irreversibly dried; and microbial by-products.

Before water will evenly infiltrate into or percolate through a soil matrix, there must be a continuous film of water on the soil particles. In other words, the soil must first be wetted before water will flow. In addition, getting the soil evenly wetted is of paramount importance to the healthy growth of plants or seeds which are to be grown in the soil. Thus, agriculturalists will often apply various wetting agent surfactant compositions directly to the soil or admix same with aqueous pesticide formulations to reduce the surface tension of the composition before applying the pesticide to the plant growth media as taught, for example, in U.S. Pat. No. 2,867,944; U.S. Pat. No. 5,595,957; U.S. Pat. No. 5,385,750; WO 96/34078; and WO 98/39273.

"Although an increasing number of researchers are aware of the occurrence and consequences of water repellency in a wide range of soils, it is still a neglected field in soil science." (Dekker et al., International Turfgrass Society Research Journal, Volume 9, 2001, pages 498–505)

It has been recognized for years that in water repellent soil significant spatial variability can occur both in soil water content and degree of water repellency. Agriculturalists have attacked the soil water repellency problem through the use of wetting agent surfactant compositions. The degree of efficacy among chemistries and formulations have varied significantly. Often, the amount of surfactant required to ameliorate water repellency and/or to enhance infiltration, either perform variably or in an attempt to improve performance, higher rates of wetting agents are applied, such elevated rates often becoming injurious to plants.

Thus, there is a continuing search for wetting agent compositions with increased wetting rate that are able to quickly penetrate and infiltrate the water repellent soil. The use of wetting agent compositions with increased wetting rates, in turn, will result in a more effective wetting of the root zone during rain events and/or irrigation applications, thereby, inducing better plant growth and decreased run-off.

SUMMARY OF THE INVENTION

The instant invention provides a process for rapidly increasing the hydrophilicity and infiltration of water into water repellent soil matrices. The process consists of applying to the water repellent soil an effective amount of a wetting agent composition comprising alkyl polyglycosides and ethylene oxide-propylene oxide (EO/PO) block copolymers in weight ratios of the polyglycoside to the block copolymer of from 6:1 to 0.5:1. These compositions unexpectedly exhibit significantly enhanced infiltration (wetting) rates in water repellent soil over that previously achieved in the art.

DETAILED DESCRIPTION OF THE INVENTION

The instant invention specifically relates to the discovery that wetting agent compositions comprising alkyl polyglycosides and ethylene oxide-propylene oxide (EO/PO) block copolymers in weight ratios of the polyglycoside to the block copolymer of from 6:1 to 0.5:1, preferably from 4:1 to 0.7:1 significantly and unexpectedly enhance water and aqueous composition transport or infiltration through the solid matrices of water repellent soil. Additionally, it has been found that these compositions are highly efficacious over a wide range of concentrations which is of critical importance in achieving maximum agronomic and/or hydrological benefit when the compositions are to be used in irrigation scenarios, e.g., both for the reduction in run-off and in the delivery of water soluble fertilizers.

The commonly accepted method of classifying the water repellency of soils is the Water Drop Penetration Time (WDPT) test (ibid.). In this test, drops of distilled water from a standard medicine dropper are placed on the smoothed solid surface of a soil sample, and the time that elapses before the drops are completely absorbed is determined. All WDPT tests are conducted under controlled conditions usually at a constant temperature of about 20° C. and a relative air humidity of about 50%. These tests are normally replicated three times.

Although soil water repellency is a relative property, varying in intensity, it is generally recognized in the art that a soil is to be considered water repellent if the WPDT exceeds five seconds. This allows soils to be qualitatively classified and referred to as being either wettable or water repellent. The instant invention is specifically directed to rapidly increasing the hydrophilicity of water repellent soil.

The ethylene oxide-propylene oxide (EO/PO) block copolymers of the instant invention include the straight block polymeric glycols obtained, for example, by the addition of ethylene oxide (EO) on a condensation product of propylene oxide (PO) with propylene glycol. The block polyoxypropylene cores, being the hydrophobe, have PO units at least about 9, and are usually in the range of from about 950 to about 4,000 mass average molecular weight. The ethylene oxide (EO) is added to the core at from about 10 weight percent to about 80 weight percent. In a preferred embodiment, the polyoxypropylene core mass average molecular weight is from about 1500 to about 2000 with EO addition of from about 20 to about 40 weight percent. Reverse block copolymers, which are also acceptable for use in the instant invention, are prepared by adding ethylene oxide to ethylene glycol to provide a hydrophile of designated molecular weight. Polypropylene oxide is then added to obtain hydrophobic blocks on the outside of the molecule. Reversing the hydrophobic and hydrophilic blocks creates surfactants similar to the regular EO/PO/EO block copolymers, but with some important differences. While the EO/PO/EO straight block copolymers tend to be better emulsifiers and dispersants and cover a broader range of molecular weights, the reverse block copolymers have lower foaming, greater defoaming, and reduced gelling tendencies. Additionally, reverse block copolymers are terminated by secondary hydroxyl groups, which have lower reactivity and acidity than the primary hydroxyl groups which terminate the EO/PO/EO straight block copolymers.

Tetra-functional block copolymers and their reverse counterparts, which are derived from the sequential addition of propylene oxide and ethylene oxide to ethylene diamine are also useful in the compositions of this invention.

Commercially available block polymeric surfactants of this type include those of the Antarox series, e.g., L-62 and L-64 marketed by Rhodia Inc.

Alkyl polyglycosides are understood to be the reaction products of sugars and fatty alcohols, suitable sugar components being the aldoses and ketoses such as glucose, fructose, mannose, galactose, talose, gulose, allose, altrose, idose, arabinose, xylose, lyxose, lactose, sucrose, maltose, maltotriose, cellobiose, mellobiase, and ribose, which are referred to hereinafter as glycoses. Particularly preferred alkyl polyglycosides are alkyl glucosides by virtue of the ready availability of glucose. In its broadest sense, the term "alkyl" in alkyl polyglycoside is intended to encompass the residue of an aliphatic alcohol, preferably a fatty alcohol, obtainable from natural fats, i.e., saturated and unsaturated residues and also mixtures thereof, including those having different chain lengths. The terms alkyl oligoglycoside, alkyl polyglycoside, alkyl oligosaccharide and alkyl polysaccharide apply to alkylated glycoses of the type in which one alkyl radical in the form of the acetal is attached to more than one glycose residue, i.e., to a polysaccharide or oligosaccharide residue; these terms are generally regarded as synonymous with one another. Accordingly, alkyl monoglycoside is the acetal of a monosaccharide. Since the reaction products of the sugars and the fatty alcohols are generally mixtures, the term alkyl polyglycoside is intended to encompass both alkyl monoglycosides and also alkyl poly(oligo)glycosides.

Optionally, there can be a polyoxyalkylene chain joining the alcohol moiety and the saccharide moiety. The preferred alkoxide is ethylene oxide.

The higher alkyl polyglycosides express surfactant properties. By "higher alkyl polyglycoside" is meant a glycoside having an alkyl substituent that averages more than four carbon atoms in size.

The lipophilic groups in the alkyl polyglycosides are derived from alcohols, preferably monohydric for compatibilizer applications and should contain from 4 to 22, preferably 7 to 16 carbon atoms. While the preferred groups are saturated aliphatic or alkyl, there may be present some unsaturated aliphatic hydrocarbon groups. Thus, the preferred groups are derived from the fatty alcohols derived from the naturally-occurring fats and oils, such as octyl, decyl, dodecyl, tetradecyl, hexadecyl, octadecyl, oleyl and linoleyl, but groups may be derived from synthetically produced Ziegler alcohols or oxo alcohols containing 9, 10, 11, 12, 13, 14 or 15 carbon atoms. The alcohols of naturally-occurring fatty acids, typically containing an even number of carbon atoms and mixtures of alcohols, are commercially available such as mixtures of $C_8$ and $C_{10}$, $C_{12}$ and $C_{14}$, and the like. Synthetically-produced alcohols, for example those produced by an oxo process, contain both an odd and even number of carbon atoms such as the $C_9$, $C_{10}$, $C_{11}$ mixtures.

From their production, the alkyl polyglycosides may contain small quantities, for example 1 to 2%, of unreacted long-chain alcohol which does not adversely affect the properties of the surfactant systems produced with them.

Specifically, the preferred alkyl polyglycosides for use in the present invention are obtained by the reaction of alkanols with glucose or other mono- or di- or polysaccharides. Preferred alkyl polyglycosides for use in the present invention are the alkyl polyglucosides obtained by the reaction of glucose with a straight or branched chain alkanol or mixture of alkanols, for example, a mixture of alkanols containing 4 to 22, preferably 7 to 16 carbon atoms, for example, 8 to 10 carbon atoms. The number of glucose groups per alkyl group in the molecule may vary and alkyl mono- or di- or polyglucose or saccharide derivatives are possible. Commercial alkylpolyglucosides usually contain a mixture of derivatives having an average number of glycose groups per alkyl group (the Degree of Polymerization or D.P.) of between 1 and 4 for example, preferably from 1 to 2. A number of suitable alkylpolyglycosides are commercially available and include, for example, AL2042 (ICI); AGRIMUL 2069 and AGRIMUL PG 2067 (Cognis) and ATPLUS 438 and ATPLUS 452 (Uniqema).

Illustrative of the many processes available for the preparation of alkyl polyglycosides useful in the present invention are those disclosed in the following U.S. Pat. Nos. 4,950, 743; 5,266,690; 5,304,639; 5,374,716; 5,449,763; and 5,457,190.

The ecotoxicity profiles of the alkyl polyglycosides show them to be among the most environmentally friendly of the nonionic surfactants and with the exception of Cognis's Agrimul PG 2067, are reported to be strong wetting agents (Alkyl Polyglycosides: Technology Properties and Applications edited by Hill, et al.—New Solutions for Agricultrual Applications; R. Garst; Chapter 7; pages 131–137).

The concentration of the wetting agent compositions of this invention in the aqueous formulations to be applied to the water repellent soil is not critical. Wetting agent composition levels of up to 200,000 ppm are contemplated in this invention for those concentrations are non-injurious to most plant. Thus, the concentration of the wetting agent in the compositions will range from about 200,000 to about 2 ppm; preferably from about 120,000 to about 5 ppm. One of the surprising features of the use of these wetting agent compositions is the outstanding effectiveness at very low concentrations: a highly desirable environmental property. In any event, appropriate concentration levels are easily determined by those skilled in the art.

With respect to the weight ratios of the alkyl polyglycosides to the EO/PO block copolymers of this invention, the synergistically enhanced wetting rate occurs when the glycoside to block copolymer ratio is from about 6:1 to 0.5:1; preferably when the ratio is from about 4:1 to about 0.7:1.

By the term "effective amount" is meant that the amount of the polyglycoside and EO/PO block copolymer in contact with the water repellent soil is such that there is a measurable increase in the wetting rate of the soil.

A simple laboratory "straw" test developed by Aquatrols Corporation of America can be used to record the initial effectiveness of a wetting agent composition on water repellent soil. (International Turfgrass Society Research Journal 7. Intertec Pubishing Corp. 1993 Chapter 67, pages 485–488) The straw test consists of taking clear plastic drinking straws (19 cm. in length and 0.5 cm. in diameter) and folding them in the center to give a sharp "V" shape, i.e., no flat crimps. Adhesive tape is used to hold the two arms of the straw in this "V" position. One arm of the straw is filled with hydrophobic soil while tapping the straw gently on a solid surface to ensure even settling of the soil in the straw. The resulting soil column is plugged with cotton and the straws arranged on a flat support. Test solutions at selected concentrations are introduced individually into each of the empty arms of the straws with a pasteur capillary pipet. The arm containing the hydrophobic soil column is laid horizontally on the support surface; the adhesive tape removed; and the arm lowered toward the support surface until the arm is at a 25° angle to the surface.

A wedge or support is fixed to the surface to ensure that the straw angle is maintained throughout the test. A stopwatch is started as soon as a test solution comes in contact with the hydrophobic soil and the time to wet a 6 cm. length of the soil column is recorded. Distilled water is usually used as a standard. This straw test is sensitive to concentrations as low as 10 ppm.

Other than in the operating examples, or where otherwise indicated, all numbers expressing quantities of ingredients or reaction conditions used herein are to be understood as modified in all instances by the term "about".

The following examples will further illustrate, but not limit, the invention with all percentages and ratios being by weight unless otherwise indicated.

EXAMPLE 1

The water repellent soil which is used in the following examples is made by coating a hydrophilic sand with octadecyl trichloro silane (OTS) as described by Bauters, et al., 1998 Soil Sci. Soc. Am. J. 62: 1185–1190.

Using the aforedescribed straw test, the infiltration rate in seconds of distilled water through a six centimeter column of this water repellent soil is determined through three replications. The results are set forth in Table I.

TABLE I

| Treatment | Replication 1 | Replication 2 | Replication 3 | Average |
|---|---|---|---|---|
| Distilled Water | 604,800 s | 691,200 s | 604,800 s | 633,600 s |

These numbers indicate the base-line hydrophobicity of this mineral soil and serve as the control in the quantification of the performance of wetting agent compositions tested.

Water droplet penetration time (WDPT) tests were also performed on this mineral soil in the following manner: The soil is evenly loaded into a deep container and the surface smoothed to realize a flat, unconsolidated substrate surface.

A 30 microliter drop of distilled water is placed on the sample surface. A stopwatch is started when the water drop contacts the soil surface and terminated when the drop is totally absorbed by the soil. The time is recorded in seconds.

The WDPT values obtained with the instant mineral soil prepared above all exceed six hours (21,600 sec) and thus this soil is extremely hydrophobic, i.e., clearly water repellent.

EXAMPLE II

Aqueous compositions of numerous alkyl polyglycosides; EO/PO block copolymers; and blends of the alkyl polyglycosides and EO/PO block copolymers in concentrations and weight ratios as indicated below are examined using the aforedescribed straw test in order to ascertain their ability to affect the infiltration wetting rate of the water repellent soil of Example 1. Agrimul is the trademark of Cognis for the alkyl polyglycoside product line, and Tetronic is a trademark of BASF for its EO/PO ethylene diamine based block copolymers. Straight "L" block copolymers and reverse "R" block copolymers are produced by various manufacturers such as Rhodia, BASF, and Uniqema.

The results of the tests are set forth in Tables IIA and IIB below.

TABLE IIA

| Wetting Agent Composition | Total Concentration in Water (ppm) | | | |
|---|---|---|---|---|
| | 8000 | 6000 | 4000 | 2000 |
| | Infiltration Time (Sec.) | | | |
| Alkyl Polyglycosides | | | | |
| AGRIMUL 2062 (50% a.i.) | 306 | 468.5 | 636 | 100000 |
| AGRIMUL 2065 (50% a.i.) | 347.75 | 444.5 | 1061.5 | 7220.75 |
| AGRIMUL 2067 (70% a.i.) | 42.14 | 48.2 | 55.66 | 316.67 |
| AGRIMUL 2069 (50% a.i.) | 45 | 51.6 | 57.8 | 360.66 |
| AGRIMUL 2072 (50% a.i.) | 33 | 57.8 | 119.8 | 100000 |
| AGRIMUL 2076 (60% a.i.) | 30.2 | 34.25 | 35.75 | 100000 |
| Straight EO/PO Block Copolymers | | | | |
| L61 | 35.25 | 58 | 62.25 | 98.75 |
| L62 | 59 | 69.75 | 105.5 | 120 |
| L64 | 55.33 | 110.33 | 259 | 376.33 |
| L92 | 35 | 41.5 | 44.75 | 154.67 |
| L101 | 43.2 | 32.25 | 41 | 64 |
| Reverse EO/PO Block Copolymers | | | | |
| 31R1 | 80.5 | | | 1770.25 |
| 17R2 | 2183 | | | 100000 |
| 25R2 | 161.5 | | | 3640.67 |
| 10R5 | 100000 | | | 100000 |
| 17R4 | 100000 | | | 100000 |
| Diamine-Based EO/PO Block Copolymers | | | | |
| TETRONIC 304 | 100000 | | | 100000 |
| TETRONIC 701 | 3227 | | | 3568.75 |
| TETRONIC 901 | 166.25 | | | 14362.25 |
| TETRONIC 1301 | 42.5 | | | 86.25 |
| Diamine-Based EO/PO Reverse Block Copolymers | | | | |
| TETRONIC 90R4 | 82738.75 | | | 100000 |
| TETRONIC 150R1 | 43.5 | | | 50.50 |

TABLE IIB

| 1:1 Weight Ratio Blends of EO/PO Block Copolymers with AGRIMUL 2067 | Total Concentration in Water (ppm) | | | |
|---|---|---|---|---|
| | 8000 | 6000 | 4000 | 2000 |
| | Infiltration Time (sec.) | | | |
| L31 | 35.5 | 38.75 | 2611 | 100000 |
| L61 | 26.25 | 31.75 | 36 | 57 |
| L62 | 31.75 | 30 | 44.25 | 63 |
| L64 | 37.33 | 41 | 46 | 73 |
| L92 | 23.75 | 31.75 | 26.25 | 39.67 |

TABLE IIB-continued

| | | | | |
|---|---|---|---|---|
| L101 | 28.75 | 29.75 | 32.75 | 42.33 |
| 25R2 | | 27.5 | | 388 |
| 31R1 | | 23 | | 50.5 |
| 17R2 | | 36.5 | | 139.25 |
| 10R5 | | 45.25 | | 100000 |
| 17R4 | | 42.75 | | 8298 |
| TETRONIC 304 | | 67.5 | | 100000 |
| TETRONIC 701 | | 32.5 | | 1901.75 |
| TETRONIC 704 | | 53.5 | | 100000 |
| TETRONIC 901 | | 34 | | 717 |
| TETRONIC 1301 | | 26.5 | | 70.5 |
| TETRONIC 90R4 | | 37 | | 100000 |
| TETRONIC 150R1 | | 41.5 | | 25.5 |

| Component | Alkyl Chain | Average Degree of Polymerization | Draves Wetting, 0.1% |
|---|---|---|---|
| AGRIMUL PG 2062 | 12/14/16 (68:26.6) | 1.4 | 20 |
| AGRIMUL PG 2065 | 12/14/16 (68:26.6) | 1.6 | 23 |
| AGRIMUL PG 2067 | 8/10 (45 · 55) | 1.7 | 120 |
| AGRIMUL PG 2069 | 9/10/11 (20:40:40) | 1.6 | 15 |
| AGRIMUL PG 2072 | 8/10/12/14/16 (30:37:22:9:2) | 1.6 | 32 |
| AGRIMUL PG 2076 | 8/10 (45:55) | 1.5 | 27 |

| | % Hydrophile | HLB Value | Average Molecular Weight |
|---|---|---|---|
| Straight Blocks (EO-PO-EO | | | |
| L31 | 10% | 5 | 1,100 |
| L61 | 10% | 3 | 2,000 |
| L62 | 20% | 7 | 2,500 |
| L64 | 40% | 15 | 2,900 |
| L92 | 20% | 6 | 3,650 |
| L101 | 10% | 1 | 3,800 |
| Reverse Blcoks (PO-EO-PO) | | | |
| 25R2 | 20% | 4 | 3,100 |
| 31R1 | 10% | 1 | 3,250 |
| 17R2 | 20% | 6 | 2,150 |
| 10R5 | 50% | 15 | 1,950 |
| 17R4 | 40% | 12 | 2,650 |
| Tetra Blocks (ED-PD added to ethylenediamine) | | | |
| TETRONIC 304 | 40% | 16 | 1,650 |
| TETRONIC 701 | 10% | 3 | 3,600 |
| TETRONIC 901 | 10% | 3 | 4,700 |
| TETRONIC 1301 | 10% | 2 | 6,800 |
| TETRONIC 90R4 | 40% | 7 | 7,240 |
| TETRONIC 150R1 | 10% | 1 | 8,000 |

The above straw test results clearly show the outstanding and unexpected synergy realized in the increase in the infiltration rate when the blends of this invention at the concentrations tested are applied to water repellent soil. With a few exceptions, such as the L31 which being a relatively smaller molecule was not particularly effective at the concentrations tested and other block copolymers with hydrophile concentrations in excess of about 40 weight percent, the wetting rate increases achieved with the instant blends are remarkable.

It is observed from the above results that the soil wetting speed increases (wetting time decreases) with increasing hydrophobe molecular weight and decreasing HLB value within each particular EO/PO block copolymer structural type, i.e., the straight EO/PO block copolymers; the reverse EO/PO block copolymers; the diamine-based EO/PO block copolymers; and the diamine-based EO/PO reverse block copolymers.

Stated another way, generally EO/PO surfactants with a lower HLB value and a higher average molecular weight show the shortest infiltration times through a column of hydrophobic soil. This trend holds true for all four surfactant structural types.

The preferred EO/PO block copolymer for use in this invention are those having an HLB value less than or equal to 10; an average molecular weight of from 2,000 to 8,000 and a percent hydrophile of from less than 10 to 40. The most preferred block copolymers are those having an HLB value less than or equal to 10; an average molecular weight of from 2,000 to 8,000 and a percent hydrophile of from less than 10 to 20.

The following example is illustrative of the magnitude of the effectiveness of the instant blends even at extremely low concentrations.

EXAMPLE III

Aqueous compositions of AGRIMUL 2067; ANTAROX L64; and a 1:1 weight ratio blend of the 2067 and L64 are prepared at various concentrations from 8000 ppm to 250 ppm. The straw test results on these compositions are set forth in Table III below. The results realized with an AGRIMUL 2069 composition are also included in Table III.

TABLE III

| Components | 8000 ppm | 6000 ppm | 4000 ppm | 2000 ppm | 1000 ppm | 500 ppm | 250 ppm |
|---|---|---|---|---|---|---|---|
| AGRIMUL 2067 | 42.14 | 48.2 | 55.66 | 316.67 | 1035 | 5117.5 | 64779 |
| AGRIMUL 2069 | 45 | 51.6 | 57.8 | 360.66 | 1008 | 6374.5 | 72036 |
| L64 | 55.33 | 110.33 | 259 | 376.33 | 578.5 | 3030.5 | 6922 |
| 1:1 2067:L64 | 37.33 | 41 | 46 | 73 | 131 | 406.5 | 1590 |

Use of the wetting agent blend of the instant invention realized more than a four-fold increase in the infiltration rate of the water repellent soil over the use of the most effective component, i.e., the EO/PO straight block copolymer alone and more than a forty-fold increase over the use of the polyglycoside alone.

EXAMPLE IV

Aqueous blends of various alkyl polyglycosides and ANTAROX 17R2 in 1:1 weight ratio and wetting agent concentration of 2000 ppm are examined using the straw test in order to ascertain their ability to affect the infiltration wetting rate of the water repellent soil of Example I. ANTAROX 17R2 is known to be a very poor wetting agent. The results of these tests are set forth in Table IV below.

TABLE IV

| Component(s) | Time (Seconds) |
|---|---|
| 17R2 | 100,000 |
| AGRIMUL 2065 | 7,220.75 |
| AGRIMUL 2067 | 316.67 |
| AGRIMUL 2069 | 360.66 |
| 17R2 + 2065 | 86.67 |
| 17R2 + 2067 | 139.25 |
| 17R2 + 2069 | 361.5 |

The above results are illustrative of the significantly enhanced filtration properties that can be achieved in water repellent soil even with very poor EO/PO block copolymer wetting agents by utilizing the polyglycosides of the instant invention.

EXAMPLE V

Aqueous compositions of AGRIMUL 2067 and ANTAROX L64 are blended at seven different weight ratios of the polyglycoside to the EO/PO block copolymer starting at 4:1 through 1:4. Each blend is prepared at four concentrations, i.e., 8000 ppm, 6000 ppm, 4000 ppm, and 2000 ppm. Straw test results on these blends are set forth in Table V below.

TABLE V

| Ratio of AGRIMUL 2067 to ANTAROX L64 | 8000 ppm | 6000 ppm | 4000 ppm | 2000 ppm |
|---|---|---|---|---|
| 4 to 1 | 34.25 | 47 | 49.25 | 71 |
| 3 to 1 | 37.25 | 41 | 80.75 | 88.5 |
| 2 to 1 | 38.75 | 36 | 74.25 | 88.75 |
| 1 to 1 | 37.33 | 41 | 46 | 73 |
| 1 to 2 | 41.25 | 43 | 109.25 | 261.75 |
| 1 to 3 | 44.5 | 68 | 3539.25 | 54532.75 |
| 1 to 4 | 79.5 | 248.5 | 43724 | 100000 |

The straw test results illustrate the outstanding synergy that can be achieved in increasing the infiltration rate in water repellent soil especially when the weight ratio of the polyglycoside to EO/PO block copolymer is within the 4:1 to 0.7:1 range.

It is anticipated that the compositions of the instant invention be also utilized in solid form, e.g., powder or granular form, by either being added to inert filler material and/or blended with fillers and additives in methods well known by those skilled in the agrochemical water dispersible or dry spreadable art. In this way, the compositions are able to be delivered in solid form to the water repellent soil and controlled release of the compositions can be achieved if one so desires.

The metes and bounds of the instant discovery are as set forth in the following paragraphs.

What is claimed is:

1. A process for increasing the wetting rate of water repellent soil which comprises the steps of:
   i) preparing an aqueous wetting agent composition consisting essentially of:
      a) alkyl polyglycoside;
      b) ethylene oxide-propylene oxide block copolymer; and
      c) water wherein the weight ratio of the alkyl polyglycoside to the block copolymer is from 6:1 to 0.5:1; and
   ii) intimately contacting water repellent soil with an effective amount of said wetting agent composition.

2. The process of claim 1 wherein the total concentration of the polyglycoside and block copolymer in the wetting agent composition is from 200,000 ppm to 2 ppm.

3. The process of claim 1 wherein the ethylene oxide-propylene oxide block copolymer is selected from the group consisting of:
   i) straight block polymeric glycols obtained by the addition of ethylene oxide (EO) on a condensation product of propylene oxide (PO) with propylene glycol;
   ii) reverse block polymeric glycols obtained by the addition of propylene oxide (PO) on a condensation product of ethylene oxide (EO) with ethylene glycol;
   iii) tetra functional block copolymers obtained by the sequential addition of initially propylene oxide and then ethylene oxide to ethylene diamine; and
   iv) tetra functional reverse block copolymers obtained by the sequential addition of initially ethylene oxide and then propylene oxide to ethylene diamine.

4. The process of claim 1 wherein the alkyl lipophilic group in the alkyl polyglycoside contains from 4 to 22 carbon atoms; and the degree of polymerization is from 1 to 4.

5. A process for increasing the wetting rate of water repellent soil which comprises the steps of
   i) preparing an aqueous wetting agent composition consisting essentially of:
      a) an alkyl polyglycoside having predominantly $C_8$ and $C_{10}$ alkyl chains and an average degree of polymerization of from 1.4 to 1.7;
      b) an EO-PO-EO block copolymer having an average molecular weight of from 2000 to 8000, a hydrophile weight percent of from less than 10 to 40; and an HLB value less than or equal to 10; and
      c) water
   wherein the weight ratio of the alkyl polyglycoside to the block copolymer is from 4:1 to 0.7:1; and
   ii) intimately contacting water repellent soil with an effective amount of said wetting agent composition.

6. The process of claim 5 wherein the block copolymer has an average molecular weight of from 2000 to 8000; a hydrophile weight percent of from less than 10 to 20; and an HLB value less than or equal to 10.

7. A process for increasing the wetting rate of water repellent soil which comprises the steps of:
   i) preparing a solid granular or powder wetting agent composition consisting essentially of:
      a) alkyl polyglycoside; and
      b) ethylene oxide-propylene oxide block copolymer
   wherein the weight ratio of the alkyl polyglycoside to the block copolymer is from 6:1 to 0.5:1; and
   ii) contacting water repellent soil with an effective amount of said solid wetting agent composition.

8. A process for increasing the wetting rate of water repellent soil which comprises the steps of
   i) preparing a solid granular or powder wetting agent composition consisting essentially of:
      a) an alkyl polyglycoside having predominantly $C_8$ and $C_{10}$ alkyl chains and an average degree of polymerization of from 1.4 to 1.7;
      b) an EO-PO-EO block copolymer having an average molecular weight of from 2000 to 8000, a hydrophile weight percent of from less than 10 to 40; and an HLB value less than or equal to 10; and wherein the weight ratio of the alkyl polyglycoside to the block copolymer is from 4:1 to 0.7:1; and ii) contacting water repellent soil with an effective amount of said solid wetting agent composition.

9. A process for increasing the wetting rate of water repellent soil which comprises the steps of:

i) preparing a solid granular or powder wetting agent composition consisting essentially of:

c) alkyl polyglycoside; and d) ethylene oxide-propylene oxide block copolymer wherein the weight ratio of the alkyl polyglycoside to the block copolymer is from 6:1 to 0.5:1; and ii) adding said solid wetting agent composition to water to form an aqueous wetting agent composition; and iii) intimately contacting water repellent soil with an effective amount of said aqueous wetting agent composition.

10. A process for increasing the wetting rate of water repellent soil which comprises the steps of i) preparing a solid granular or powder wetting agent composition consisting essentially of:

a) an alkyl polyglycoside having predominantly $C_8$ and $C_{10}$ alkyl chains and an average degree of polymerization of from 1.4 to 1.7;

b) an EO-PO-EO block copolymer having an average molecular weight of from 2000 to 8000, a hydrophile weight percent of from less than 10 to 40; and an HLB value less than or equal to 10; and wherein the weight ratio of the alkyl polyglycoside to the block copolymer is from 4:1 to 0.7:1; and ii) adding said solid wetting agent composition to water to form an aqueous wetting agent composition; and iii) intimately contacting water repellent soil with an effective amount of said aqueous wetting agent composition.

* * * * *